United States Patent [19]

Michaels et al.

[11] Patent Number: 5,153,246

[45] Date of Patent: Oct. 6, 1992

[54] ETHYLENICALLY UNSATURATED ISOCYANURATES HAVING IMPROVED ADHESION

[75] Inventors: Joseph B. Michaels; James J. Phipps, both of Pittsburgh; John W. Lauritzen, Monroeville, all of Pa.

[73] Assignee: Reichhold Chemicals, Inc., Durham, N.C.

[21] Appl. No.: 731,800

[22] Filed: Jul. 17, 1991

Related U.S. Application Data

[63] Continuation-in-part of Ser. No. 696,860, May 8, 1991.

[51] Int. Cl.⁵ .................... C08K 5/3477; C08G 63/52
[52] U.S. Cl. .................... 524/101; 525/28; 525/44; 525/45
[58] Field of Search ............ 524/101; 525/28, 44, 525/45

[56] References Cited

U.S. PATENT DOCUMENTS

| 3,933,728 | 1/1976 | Henbest | 525/28 |
| 4,289,684 | 9/1981 | Kallaur | 525/28 |

FOREIGN PATENT DOCUMENTS

| 0108122 | 7/1982 | Japan | 525/28 |
| 0123211 | 7/1982 | Japan | 525/45 |

Primary Examiner—Paul R. Michl
Assistant Examiner—Peter Szekely
Attorney, Agent, or Firm—Rodman & Rodman

[57] ABSTRACT

An ethylenically unsaturated isocyanurate composition suitable for formulating SMC systems for the molding of structural automobile body parts requiring high levels of adhesion is prepared by blending the isocyanurate composition with a minor amount of a dicyclopentadiene terminated unsaturated polyester. These parts have excellent retention of physical properties when exposed to high temperature.

15 Claims, No Drawings

ETHYLENICALLY UNSATURATED ISOCYANURATES HAVING IMPROVED ADHESION

This application is a continuation in part of 07/696860 filed May 18, 1991 now pending.

BACKGROUND OF THE INVENTION

1. Field of the Invention

This invention relates to ethylenically unsaturated isocyanurates and more particularly to ethylenically unsaturated isocyanurates having improved adhesion, and excellent retention of physical properties when exposed to high temperature for structural molding applications.

2. The Prior Art

U.S. Pat. No. 4,128,537 to Markiewitz and U.S. Pat. No. 4,195,146 to Markiewitz et al each discloses the preparation of ethylenically unsaturated isocyanurates in a two-step process wherein a polyisocyanate is first reacted with an ethylenically unsaturated monohydroxy alcohol in the presence of a copper salt to form an isocyanate-containing urethane. Thereafter, the urethane is trimerized in the presence of a suitable catalyst, such as a tertiary amine, to prepare the ethylenically unsaturated isocyanurate. Other patents of interest include:

U.S. Pat. No. 4,035,439 and U.S. Pat. No. 4,088,257 both to Stevenson disclose a one component low-shrink molding composition comprising a linear polyurethane thermoplastic in combination with a dicyclopentadiene modified thermosetting polyester resin and a coreactive vinyl monomer.

U.S. Pat. No. 4,777,209 to Hefner et al discloses compositions of polycycloalkenyl-terminated unsaturated polyesters and vinyl reactive plasticizers composed of vinyl terminated urethane oligomers containing at least one polyglycol unit.

The ethylenically unsaturated isocyanurates may be homopolymerized or copolymerized with ethylenically unsaturated monomers to form high molecular weight polymers having excellent physical properties. For example, the ethylenically unsaturated isocyanurates have been found to be particularly useful in applications such as castings, coatings and laminates where it is desirable to have excellent combinations of flexural, tensile and impact properties at elevated temperatures.

The ethylenically unsaturated isocyanurate resins have been considered for the formulation of molding compositions, referred to in the art as "sheet molding compounds" (SMC), which generally comprise a curable ethylenically unsaturated polyester resin as a major component dissolved in a suitable unsaturated crosslinking monomer containing terminal vinyl groups, such as styrene and admixed with curing agents, polymerization inhibitors, release agents, fibrous reinforcing materials, fillers, and pigments.

These SMC systems can be molded into articles having various forms by various molding processes, such as compression molding, transfer molding and injection molding under heat and pressure.

Although ethylenically unsaturated isocyanurates are known to the art, these compositions when considered for the formulation of SMC systems for structural automobile part applications lack the requisite adhesion properties for bonding these parts to each other or other parts used in the assembly of automobiles.

Therefore, the art is seeking means by which the adhesion properties of molded ethylenically unsaturated isocyanurate resins can be substantially improved so that these compositions may be more effectively used in the formulation of SMC systems for the manufacture of automobile parts.

SUMMARY OF THE INVENTION

In accordance with the present invention, there is provided an ethylenically unsaturated isocyanurate composition blended with a minor amount of dicyclopentadiene terminated unsaturated polyester, which is suitable for formulating SMC systems capable of molding automobile body parts requiring high levels of adhesion, and retention of physical properties when exposed to high temperature.

SMC formulations prepared using the ethylenically unsaturated isocyanurate dicyclopentadiene terminated unsaturated polyester blend compositions of the present invention have substantially improved adhesion without significant diminution of physical properties.

DESCRIPTION OF THE PREFERRED EMBODIMENTS

The ethylenically unsaturated isocyanurates used in the present invention are prepared by reacting a polyisocyanate with an ethylenically unsaturated monohydroxy alcohol to prepare a urethane intermediate product which is then trimerized in the presence of a copper salt.

Polyisocyanates used to prepare the ethylenically unsaturated isocyanurate include aliphatic, cycloaliphatic and aromatic diisocyanates containing 6 to 18 carbon atoms, for example, 1,6-hexamethylene diisocyanate, 2,4' and 4,4' dicyclohexyl-methane diisocyanate, "isophorone" diisocyanate, 2,4- and 2,6-toluene diisocyanate (TDI) and 2,4' and 4,4'-diphenylmethane diisocyanate and mixtures thereof. 2,6-toluene diisocyanate (TDI) is preferred in making the ethylenically unsaturated isocyanurates used to prepare the blend compositions of the present invention.

The ethylenically unsaturated monohydroxy alcohols which can be reacted with the polyisocyanates to prepare the trimerizable urethane intermediate include 4-vinylbenzyl alcohol, ester alcohols such as hydroxyalkyl acrylates and methacrylates including hydroxypropyl methacrylate, hydroxyethyl methacrylate, hydroxyethyl acrylate, hydroxypropyl acrylate, pentaerythritol triacrylate, 8-hydroxyoctyl acrylate, 12-hydroxydodecanyl acrylate, 2-hydroxy-3-chloropropyl acrylate, 2-hydroxy-3-acryloyloxypropyl acrylate, and 2-hydroxy-3-phenoxypropyl acrylate. Preferred alcohols include the ester alcohols, particularly hydroxypropyl methacrylate, hydroxyethyl methacrylate, hydroxyethyl acrylate and hydroxypropyl acrylate.

The reaction of the polyisocyanate with the ethylenically unsaturated monohydric alcohol to prepare the intermediate urethane product can be carried out at a temperature of about 10° C. to about 130° C., and preferably about 40° C. to about 95° C. in the presence of a copper salt.

Illustrative examples of copper salts which can be used include cupric acetate, cupric benzoate, cupric glycinate, cupric acetylacetonate, cupric sulfate, cupric oxalate, cupric chloride, cupric bromide, cupric nitrate, cupric naphthenate, cupric formate, mono- and dicupric salts of ethylenediaminetetraacetic acid, cuprous chloride, cuprous bromide, cuprous cyanide, and cupric propionate. A preferred catalyst is cupric acetate.

The amount of copper salt used will depend on the particular copper salt selected and on the particular polyisocyanate and ethylenically unsaturated monohydroxy alcohol used. In general, the amount of salt employed is about 0.001% to 1%, based on the total weight of polyisocyanate and alcohol. A preferred amount of copper salt is about 0.02% to 0.2%.

The reaction of the polyisocyanate and the ethylenically unsaturated monohydric alcohol is continued until essentially all of the hydroxyl groups have reacted to prepare the intermediate urethane reaction product. The isocyanate-containing urethane product can then be trimerized by any procedure conventional in the prior art for trimerizing isocyanates.

A preferred method of trimerizing the isocyanate-containing urethane comprises maintaining the urethane reaction product at a temperature from about 0° C. to about 75° C., adding a trimerization catalyst, and maintaining the temperature from about 0° C. to about 95° C., and preferably from about 20° C. to about 60° C., and continuing the trimerization reaction until the reaction mixture has an acid number of about 1.0.

The trimerization catalyst can be any catalyst known in the prior art for trimerizing isocyanates. Illustrative examples of such catalysts include tertiary amines such as N,N-dimethyl aniline, N-methyl morpholine, triethylene tetramine, tributyl phosphine, and N-benzyltrimethylammonium hydroxide. The trimerization catalyst is best employed in the range of from about 0.04% to about 1%, based on the total weight of isocyanate and alcohol used.

In order to be able to store the ethylenically unsaturated isocyanurates for an extended period of time, it is desirable to add a chemical compound which will react with the trimerization catalyst or to add a stabilizer to prevent polymerization through the ethylenic double bond.

Exemplary compounds which can be added to the final reaction product to neutralize the trimerization catalyst include acids such as acetic, phosphoric, sulfuric, oxalic, methanesulfonic and acrylic. Generally the amount of acid should range from about 0.04 and about 0.08 percent by weight of the reaction mixture. The addition of an acid to neutralize the trimerization catalyst is effective to impart extended shelf life to the isocyanurate products.

In order to avoid premature polymerization of the ethylenically unsaturated isocyanurates, a small amount of a conventional polymerization inhibitor, such as hydroquinone, tertiary butyl catechol, or methyl ether of hydroquinone is incorporated in the reaction mixture.

Although the preparation of the ethylenically unsaturated polyisocyanurate can be conducted in the absence of a solvent, it is preferred to carry out the urethane forming reaction and the trimerization reaction in the presence of a solvent for the reactants.

Illustrative examples of solvents which can be employed to prepare the ethylenically unsaturated polyisocyanurate include polymerizable solvents, such as styrene, methyl methacrylate, divinylbenzene, ethyl methacrylate, ethyl acrylate, methyl acrylate, 2-ethylhexyl acrylate, 2-ethylhexyl methacrylate, butyl acrylate, butyl methacrylate, isobutyl methacrylate, cyclohexyl methacrylate, cyclohexyl acrylate, chlorostyrene, vinyl acetate, vinyl stearate, vinyltoluene, hexanediol diacrylate, hexanediol dimethacrylate, polyethylene glycol diacrylate, dimethylstyrene, ethylstyrene and propylstyrene. Styrene is the solvent preferred in the preparation of the ethylenically unsaturated polyisocyanurates.

In general, the amount of solvent used will be from about 10 to 40% by weight, and preferably from about 25% to 35% by weight, based on the total weight of the reaction mixture used to prepare the ethylenically unsaturated isocyanurate.

The dicyclopentadiene-terminated unsaturated polyester which is blended with the ethylenically unsaturated isocyanurate to prepare the blend compositions of the present invention is also known to the art, for example, U.S. Pat. Nos. 4,035,439 and 4,048,257 both to Stevenson.

The dicyclopentadiene-terminated unsaturated polyester polymer preferably comprises an ester copolymer of a glycol, an unsaturated dicarboxylic acid and dicyclopentadiene. The polyester is produced by charging dicyclopentadiene and water to a reactor and heating under agitation in an inert atmosphere of about 95° C. Under these conditions, the dicyclopentadiene and water undergo little or no reaction.

An alpha, beta-ethylenically unsaturated dicarboxylic acid or anhydride such as maleic anhydride is added and immediately undergoes an exothermic reaction with the dicyclopentadiene which forms the half ester. The addition of the alpha, beta-ethylenically unsaturated acid is in portions and at a rate such that the reactor temperature does not exceed 140° C. to avoid cracking the dicyclopentadiene which would result in forming the undesired nadic moiety.

In forming the half ester, one carboxylic acid group of the alpha, beta-ethylenically unsaturated dicarboxylic acid will add across the double bond of the strained ring of the dicyclopentadiene molecule to form the half ester.

In the final step, a polyhydroxy alcohol such as ethylene glycol is added to the reactor, and reacts with the remaining carboxyl group of the half ester. As each of the two hydroxyls of the glycol react in like manner with one half ester moiety, a dicyclopentadiene monoalcohol endcapped polyester resin is formed.

Alpha, beta-ethylenically unsaturated dicarboxylic acids which are suitable for the reaction to form the dicyclopentadiene terminatedunsaturated polyester component of the blend composition of the present invention include maleic acid, fumaric acid, itaconic acid, methyl maleic acid, and citraconic acid. Maleic acid is the alpha, beta-ethylenically unsaturated dicarboxylic acid preferred for use in the preparation of the unsaturated polyester resin blend component. The term "dicarboxylic acid" is also intended to include anhydrides of the acids which form anhydrides.

Polyhydric alcohols commonly used in forming the dicyclopentadiene terminated unsaturated polyester include glycols such as ethylene glycol, propylene glycol, diethylene glycol, dipropylene glycol, butanediol, hexanediol, and can also include higher polyhydric alcohols such as pentaerythritol, triethylene glycol, trimethylol propane, and glycerol. Ethylene glycol and propylene glycol are preferred as the alcohol component.

The blend composition of the present invention comprises a mixture of at least about 10 percent by weight of the dicyclopentadiene terminated unsaturated polyester, and preferably about 20 to about 30 weight percent, and about 70 to about 90 weight percent of the ethylenically unsaturated isocyanurate.

The blends of unsaturated isocyanurate and dicyclopentadiene terminated unsaturated polyester can be polymerized or cured in accordance with polymerization conditions conventional in the art for the polymerization of ethylenically unsaturated materials. In general, the polymerization can be carried out by reacting the blend of ethylenically unsaturated isocyanurate and dicyclopentadiene terminated ethylenically unsaturated polyester in the presence of a free radical polymerization catalyst. Suitable polymerization catalysts include the various peroxide initiators such as benzoyl peroxide, methyl ethyl ketone peroxide, t-butyl perbenzoate, dicumyl peroxide, and t-butyl hydroperoxide. The amount of catalyst employed varies from about 1.0 to about 1.5 percent by weight of the blend composition.

To prepare compositions suitable for molding and particularly in the formulation of SMC systems, the isocyanurate and dicyclopentadiene terminated polyester blend components are blended and dissolved in a cross-linkable vinyl monomer to form a solution preparatory to the formulation of an SMC system. The solution generally contains about 60 to about 80 percent by weight of the blend composition and about 20 to about 40 percent by weight of the vinyl monomer.

SMC systems and particularly those suitable for automotive applications are formulated containing about 40 to about 70 parts by weight of the blend composition of the present invention, and preferably about 30 to about 60 parts by weight of reinforcing fibers. Styrene and vinyl toluene are preferred vinyl monomers, although other terminal unsaturated monomers can be employed. Generally the vinyl monomer is employed in amounts ranging from about 20 to about 50 parts by weight per 100 parts of the blend composition and preferably in amounts ranging from about 40 to about 55 parts per 100 parts of the blend composition.

A wide variety of reinforcing fibers are suitable for the preparation of SMC systems in accordance with the practice of the present invention including glass fibers, carbon fibers, sisal fibers, aramid fibers, steel fibers, boron fibers and graphite fibers. Generally reinforcing fibers are incorporated in the SMC formulations in amounts ranging from about 30 to about 60 parts per 100 parts of the blend composition.

In accordance with the present invention, in formulating SMC systems using the blend composition of the present invention dissolved in a vinyl monomer, a free radical polymerization catalyst is present in an amount of at least about 1.0 part per 100 parts by weight of the blend composition, and preferably about 1.2 to about 2.0 parts per 100 parts by weight of the blend composition.

The free radical polymerization catalyst is added to the uncured SMC system so that upon heating to the catalyst activation temperature, the cross-linking polymerization reaction will commence between the vinyl monomer and the unsaturated blended resins.

Fillers can be added to the uncured SMC system to reduce overall material costs without a significant reduction of desirable physical properties in the molded part, and alternatively, to impart desired specific properties to the SMC system. Many different types of fillers can be used such as inorganic fillers, including silicates, calcium carbonate, mica, barytes, clay, diatomaceous earth, silica and Fullers earth; and organic fillers such as wood flour, cork dust, cotton flock, wood felt, shredded cornstalks and ground nut shells. These fillers can be added in amounts ranging from about 0 parts to 40 parts by weight, and preferably about 10 to about 20 parts per 100 parts of the blend composition of the present invention.

Internal mold release agents such as zinc stearate, calcium stearate, magnesium stearate, and organic phosphate esters can also be incorporated in the SMC systems at amounts ranging from about 0.5 to about 2.5 parts per 100 parts of the blend composition and preferably about 1.0 to about 2.0 parts per 100 parts of the blend.

In the manufacture of automobile parts, the blend composition of the present invention can be conveniently molded using standard molding techniques such as compression molding, injection molding, and the like.

The present invention is further illustrated by the following examples wherein all parts and percentages are by weight unless otherwise indicated.

EXAMPLE 1

Preparation of Ethylenically Unsaturated Isocyanurate

A heatable glass reaction vessel equipped with water separator, agitator and nitrogen supply was charged with the following materials:

| Component | Moles |
| --- | --- |
| Hydroxypropyl methacrylate | 0.2268 |
| Styrene | 0.4945 |
| Copper acetate | 0.0003 |
| Dimethylamino propanol | 0.0001 |
| Monoethyl hydroquinone | 0.0002 |
| Epoxy fatty acid | 0.0013 |
| (Flexol TM EPO, Union Carbide Co.) | |
| Tertiary butyl catechol | 0.0001 |

The solution was heated to 90° C. and 0.2657 mole toluene diisocyanate was added over a 90 minute period. The temperature of the reaction medium during the addition of the toluene diisocyanate was maintained at 90° C. for 90 minutes. After the addition of the toluene diisocyanate was completed, the reaction mixture was cooled to 47° C. 0.0016 moles of a trimerization catalyst, benzoyl trimethyl ammonium hydroxide, was then added and the reaction mixture was held at 60° C. for 3 hours, and cooled to 45° C. 0.0006 moles methane sulfonic acid and 0.0004 moles parabenzoquinone were then added.

The isocyanurate solution had the following physical properties:

| | |
| --- | --- |
| Viscosity (RVF #2 @ 20 rpm), poise | 2.50–4.50 |
| Gel Time, minutes | 4.2–5.2 |
| Total Cure Time, minutes | 6.0–7.5 |
| Peak, °C. | 225–250 |
| Solids, weight % | 49.5–53.5 |
| Acid Number (solution basis) | 1.00 |
| Water, weight % | 0.20 |
| Color, Gardner | 10.0 |
| Hydroxyl Number | 12.0–18.0 |
| 55° C. Uncatalyzed Stability, tube, days | 5.0 |

EXAMPLE 2

Preparation of Dicyclopentadiene Terminated Unsaturated Polyester

The reaction to prepare the dicyclopentadiene terminated unsaturated polyester was affected in the known manner in a heatable glass apparatus equipped with agitator, water separator and nitrogen supply and cooling means. The reaction mixture consisted of the following materials:

| Component | Moles |
|---|---|
| Dicyclopentadiene | 113.5000 |
| Water | 108.0000 |
| Maleic anhydride | 100.0000 |
| Ethylene glycol | 54.0000 |
| Hydroquinone | 0.0084 |

The dicyclopentadiene, water and a first 53.2 mole portion of the maleic anhydride were separately charged to the reactor heated to 95° C. The addition of the maleic anhydride caused an exothermic reaction which raised the reactor temperature to 125° C. The reactor contents were cooled to 110° C. A second 20 mole portion of maleic anhydride was charged to the reactor and the temperature of the reactor contents was raised to 125° C. by the exotherm. After reaching 125° C. the reactor contents were cooled to 110° C. and a third and final 26.8 mole portion of maleic anhydride was added to the reactor. Again the temperature of the reaction mixture was raised to 125° C. and thereafter allowed to cool.

To the cooled contents of the reactor were added 54.0 moles of ethylene glycol and 0.0084% hydroquinone. The temperature of the reactor was raised to 200° C. and the reactor contents heated for 12 hours to form a dicyclopentadiene terminated unsaturated polyester having the following physical properties:

| % Non-volatiles | 70.5–73.5 |
|---|---|
| Acid No. | 20.0 |
| Color, Gardner | 4 |
| Appearance | Clear |
| Specific Gravity | 1.08–1.16 |
| Viscosity (LVF #3 @ 60 rpm, CPS) | 1100 |
| SPI Gel, minutes | 7.0–10.0 |
| SPI Cure, minutes | 3.0–6.0 |
| SPI Peak, °F. | 330–360 |

EXAMPLE 3

Clear cast systems consisting of blends of the ethylenically unsaturated isocyanurate prepared in Example 1 (designated "Isocyanurate") blended at weight ratios of 80/20 and 70/30 with the dicyclopentadiene terminated polyester of Example 2 (designated "DCPD") were prepared to determine the retention of properties of the blends when molded, and exposed to 270° C. Included in these blends was 1.0% by weight benzoyl peroxide and 50% by weight of styrene. The thus prepared clear cast systems were poured into glass molds and molded into 6 inch×9 inch×125 mil thick panels by first heating the mold at 110° F. for 1 hour followed by 7 hours at 120° F., room temperature overnight, post cured for 1 hour at 250° F. and 1 hour at 350° F. followed by slow cooling to room temperature.

The physical properties at room temperature and 270° F. of these panels are recorded in Tables 1 and 2 which follow.

For purposes of contrast, a clear cast system was formulated in which the dicyclopentadiene terminated polyester of Example 2 was not incorporated in the system. These comparative clear cast systems were also cast into 125 mil thick panels following the procedure of Example 3.

The physical properties of these comparative cast systems are also recorded in Tables 1 and 2.

TABLE 1

Physical Properties at 72° F.
Of Castings Prepared From Isocyanurate/DCPD Blends

| Blend Components | Weight Ratio | Flexural Strength psi | Flexural Modulus $10^6$ psi | Toughness In.-lb/In.$^3$ |
|---|---|---|---|---|
| Isocyanurate/DCPD | 80/20 | 15,100 | 0.53 | 26.0 |
| Isocyanurate/DCPD | 70/30 | 13,900 | 0.53 | 22.0 |
| Isocyanurate (comparative blend) | 100 | 16,950 | 0.54 | 33.0 |

TABLE 2

Physical Properties at 270° C.
Of Isocyanurate/DCPD Blends

| Blend Components | Weight Ratio | Flexural Strength Psi | % Retention | Flexural Modulus $10^6$ psi | % Retention | Flexural Toughness In.-lb/In.$^3$ | % Retention |
|---|---|---|---|---|---|---|---|
| Isocyanurate/DCPD | 80/20 | 6,850 | 45 | 0.25 | 47 | 62 | 238 |
| Isocyanurate/DCPD | 70/30 | 6,700 | 48 | 0.24 | 45 | 49 | 222 |
| Isocyanurate (comparative blend) | 100 | 7,100 | 42 | 0.25 | 46 | 58 | 176 |

Referring to Tables 1 and 2, it is evident that the physical properties of castings prepared from isocyanurate/DCPD blends have physical properties comparable to isocyanurate compositions in which the dicyclopentadiene terminated unsaturated polyester is absent and that these physical properties are substantially retained at elevated temperatures (270° F.).

EXAMPLE 4

An SMC system of the type used for molding automotive parts was prepared using a blend containing an 80/20 weight ratio of the ethylenically unsaturated isocyanurate of Example 1 (designated "Isocyanurate") and the dicyclopentadiene terminated polyester of Example 2 (designated "DCPD"). The blend was then mixed with 58% by weight glass fibers to prepare the SMC system and included 40 parts styrene, 1.2 parts per hundred parts of resin of peroxy ketal catalyst (Trigonox TM 29B75, Akzo Chemical Inc.), specifically 1,1 di-t-butyl peroxy-3,5,5 trimethyl cyclohexane, and one part per hundred parts of resin of zinc stearate.

The SMC system was then compression molded into 125 mil thick panels at 280° F. and 350 psi for 180 seconds. The physical properties of these panels were determined at 72° F. and 270° F. and are recorded in Tables 3, 4 and 5.

For purposes of contrast, the procedure of Example 4 was repeated to prepare two SMC systems wherein the Isocyanurate was used without the addition of DCPD and the systems were compression molded into 125 mil thick panels at 280° F. and 350 psi for 180 seconds. The physical properties of these comparative SMC systems (designated "C") are also recorded in Tables 3, 4 and 5. In these Tables, isocyanurate $C_1$ contains 56% by weight glass fibers and Isocyanurate $C_2$ contains 63% by weight glass fibers.

TABLE 3

Tensile Properties at 72° F.
Of SMC System Prepared Using Isocyanurate/DCPD Blend

| SMC System | Tensile Strength, psi | Tensile Modulus, $10^6$ psi | Tensile Elongation, % | Tensile Toughness, In.-lb/In.$^3$ |
|---|---|---|---|---|
| Isocyanurate/DCPD | 33,800 | 2.13 | 1.96 | 370 |
| $C_1$ | 31,400 | 2.14 | 1.98 | 348 |
| $C_2$ | 27,800 | 2.13 | 1.88 | 295 |

TABLE 4

Flexural Properties at 72° C.
Of SMC System Prepared Using Isocyanurate/DCPD Blend

| SMC System | Flexural Strength, psi | Flexural Modulus, $10^6$ psi | Flexural Toughness, In.-lb/In.$^3$ |
|---|---|---|---|
| Isocyanurate/DCPD | 58,950 | 2.2 | 193 |
| $C_1$ | 63,450 | 2.3 | 174 |
| $C_2$ | 54,500 | 2.0 | 163 |

TABLE 5

Flexural Properties at 270° C.
Of SMC System Prepared Using Isocyanurate/DCPD Blend

| SMC System | Flexural Strength psi | Retention % | Flexural Modulus $10^6$ psi | Retention % | Flexural Toughness In.-lb/In.$^3$ | Retention % |
|---|---|---|---|---|---|---|
| Isocyanurate/CPD | 39,000 | 66 | 1.6 | 73 | 100 | 52 |
| $C_1$ | 39,850 | 63 | 1.6 | 70 | 135 | 78 |
| $C_2$ | 37,150 | 68 | 1.4 | 70 | 95 | 58 |

By referring to Tables 3, 4 and 5 it is evident that the physical properties of an SMC molding prepared using glass fibers filled isocyanurate/DCPD blends have physical properties comparable to glass fiber filled SMC moldings prepared from unmodified isocyanurate compositions and that these physical properties are retained at elevated temperatures (270° F.).

EXAMPLE 5

The procedure of Example 4 was repeated using the molded SMC panels prepared in Example 4 to determine the adhesion properties of the isocyanurate/DCPD blend as well as the surface appearance of the SMC molding.

Adhesion was determined by applying to a dry wiped surface of a 1 inch×4 inch section of a panel molded from the isocyanurate/DCPD SMC formulation prepared in Example 4, a thin level layer of a commercially available epoxy adhesive (Fusor TM 320/322 Lord Corp.). A second dry wiped panel was placed upon the adhesive applied section of the first panel with the ends overlapping one square inch. The overlapped panel assembly was then allowed to cure at room temperature for 24 hours followed by a post cure in a heating cabinet for two hours at 200° F. The test specimens were adhesion tested in an Instron tension machine. The force required to separate the overlapped panel ends is recorded in Table 6. The amount of material remaining on the overlapped portions of the separated panel portions was visually inspected and given a % rating.

Test specimens of the molded SMC formulations prepared in Example 5 were also evaluated for appearance using visual and light grid methods known in the art. The test specimens were rated from 1 to 10. A rating of 10 denoted the best appearance and a rating of 1 denoted the worst appearance. The appearance rating of the molded test specimen is recorded in Table 6.

For purposes of contrast, the procedure of Example 5 was repeated to prepare an SMC system using comparative SMC formulations $C_1$ and $C_2$. The adhesion and appearance values of these comparative systems are also recorded in Table 6.

TABLE 6

Adhesion and Appearance Values
of Molded SMC Formulation Prepared Using
Isocyanurate/DCPD Blend Of Example 4

| SMC System | Maximum Load, psi | Fiber Tear, % Estimated | Appearance Rating |
|---|---|---|---|
| Isocyanurate/DCPD | 1,329 | 45-50 | 7-8 |
| $C_1$ | 571 | 0 | 2 |
| $C_2$ | 509 | 0 | 2 |

With reference to Table 6, it is evident that a molded SMC system of greatly increased adhesion and appearance can be achieved without substantial diminution of physical properties using a glass fiber filled resin prepared by blending ethylenically unsaturated isocyanurates with a minor amount of dicyclopentadiene terminated unsaturated polyester.

What is claimed is:

1. An ethylenically unsaturated isocyanurate composition for use in molding an article exhibiting high levels of adhesion, consisting essentially of a blend of:
   (a) about 70 to 90 weight % of an ethylenically unsaturated isocyanurate formed from the trimerized reaction product of a urethane intermediate, wherein said urethane intermediate is formed from the reaction of a polyisocyanate and an ethylenically unsaturated monohydroxy alcohol; and
   (b) about 10 to 30 weight % of a dicyclopentadiene terminated ethylenically unsaturated polyester.

2. The composition of claim 1, wherein the polyisocyanate is toluene diisocyanate.

3. The composition of claim 1, wherein the ethylenically unsaturated monohydroxy alcohol is a hydroxyalkyl acrylate or methacrylate.

4. The composition of claim 3, wherein the hydroxyalkyl methacrylate is hydroxypropyl methacrylate.

5. The composition of claim 1, wherein the dicyclopentadiene ethylenically unsaturated polyester is selected from the group consisting of the ester copolymer of a glycol, an unsaturated dicarboxylic acid and an alpha, beta-ethylenically unsaturated dicarboxylic acid or anhydride.

6. The composition of claim 4, wherein the glycol is ethylene glycol.

7. The composition of claim 4, wherein the alpha, beta-ethylenically unsaturated dicarboxylic acid anhydride is maleic anhydride.

8. The composition of claim 1, wherein the blend contains about 70 to about 80 percent by weight of the ethylenically unsaturated isocyanurate and about 20 to about 30 percent by weight of the dicyclopentadiene terminated ethylenically unsaturated polyester 9. A sheet molding composition suitable for the manufacture of structural automobile parts exhibiting superior adhesion, comprising
(a) the ethylenically unsaturated isocyanurate composition of claim 1,
(b) a reinforcing fiber, and
(c) a free radical polymerization catalyst.

10. The sheet molding composition of claim 9, wherein the reinforcing fiber comprises glass fibers.

11. The sheet molding composition of claim 9, wherein the reinforcing fiber comprises about 30 to 60 weight %.

12. The sheet molding composition of claim 9, wherein the free radical polymerization catalyst is a peroxy ketal catalyst.

13. A molded product made by the application of heat and pressure to the blend composition of claim 1.

14. A method for improving the adhesion properties of a molded article made from a sheet molding composition comprising an ethylenically unsaturated isocyanurate composition, by incorporating therein about 10 to 30 weight % of a dicyclopentadiene terminated ethylenically unsaturated polyester; wherein said ethylenically unsaturated isocyanurate component is formed from the trimerized reaction product of a urethane intermediate, and wherein said urethane intermediate is formed from the reaction of a polyisocyanate and an ethylenically unsaturated monohydroxy alcohol.

15. A method for improving the retention of physical properties in a molded article exposed to high temperature; said article being formed from an ethylenically unsaturated isocyanurate sheet molding composition, by incorporating therein about 10 to 30 weight % of a dicyclopentadiene terminated ethylenically unsaturated polyester; wherein said ethylenically unsaturated isocyanurate component is formed from the trimerized reaction product of a urethane intermediate, and wherein said urethane intermediate is formed from the reaction of a polyisocyanate and an ethylenically unsaturated monohydroxy alcohol.

* * * * *

UNITED STATES PATENT AND TRADEMARK OFFICE
CERTIFICATE OF CORRECTION

PATENT NO. : 5,153,246
DATED : December 2, 1992
INVENTOR(S) : Joseph B. Michaels et al It is certified that error appears in the above-identified patent and that said Letters Patent is hereby corrected as shown below:

At column 1, line 7, change "18" to --8--

At column 4, line 47, change "terminatedunsaturated" to --terminated unsaturated--

At column 9, line 41, change "CPD" to --DCPD--

Signed and Sealed this

Nineteenth Day of October, 1993

Attest:

BRUCE LEHMAN

Attesting Officer      Commissioner of Patents and Trademarks